United States Patent
Reid

(10) Patent No.: US 11,017,917 B2
(45) Date of Patent: May 25, 2021

(54) DIELECTRIC COMPOSITE CONTAINING DISPERSED PRIMARY NANOPARTICLES OF ALUMINUM OR ALUMINUM OXIDE

(71) Applicant: Helicon Chemical Company, Orlando, FL (US)

(72) Inventor: David Reid, Orlando, FL (US)

(73) Assignee: Helicon Chemical Company, Orlando, FL (US)

( * ) Notice: Subject to any disclaimer, the term of this patent is extended or adjusted under 35 U.S.C. 154(b) by 127 days.

(21) Appl. No.: 16/351,825

(22) Filed: Mar. 13, 2019

(65) Prior Publication Data

US 2019/0287694 A1 Sep. 19, 2019

Related U.S. Application Data

(60) Provisional application No. 62/642,683, filed on Mar. 14, 2018.

(51) Int. Cl.
*H01G 4/14* (2006.01)
*H01B 3/00* (2006.01)
*H01G 4/12* (2006.01)

(52) U.S. Cl.
CPC ........... *H01B 3/004* (2013.01); *H01G 4/1209* (2013.01); *H01G 4/14* (2013.01)

(58) Field of Classification Search
CPC .. H01G 4/08; H01G 4/10; H01G 4/14; H01G 4/16; H01G 4/18; H01G 4/012; H01G 4/1209; H01G 4/206; H01B 3/00; H01B 3/004
USPC ....................................................... 523/200
See application file for complete search history.

(56) References Cited

U.S. PATENT DOCUMENTS

| | | | |
|---|---|---|---|
| 5,318,930 A | 6/1994 | Leung et al. | |
| 5,352,522 A | 10/1994 | Kugimiya et al. | |
| 6,159,871 A | 12/2000 | Loboda et al. | |
| 9,573,857 B2 | 2/2017 | Reid et al. | |
| 2004/0180988 A1* | 9/2004 | Bernius | B82Y 30/00 523/160 |
| 2013/0317170 A1 | 11/2013 | Marks et al. | |
| 2014/0090756 A1* | 4/2014 | Reid | B22F 1/0062 149/11 |
| 2016/0208073 A1* | 7/2016 | Parantaman | C08J 5/18 |

OTHER PUBLICATIONS

Huang et al, 'Preparation, microstructure and properties of polyethylene aluminum nanocomposite dielectrics', Composites Science and Technology, vol. 68, Mar. 25, 2008 (Mar. 25, 2008), p. 2134-2140.
International Search Report and Written Opinion, ISA, US, dated Jun. 17, 2019.
Xu et al, 'Effects of the low loss polymers on the dielectric behavior of novel aluminum-filled high-k nano-composites', Proceedings of the IEEE 54th Electronic Components and Technology Conference, Aug. 9, 2004 (Aug. 9, 2004), p. 158-170, [retrieved May 21, 2019 (May 21, 2019) via the internet at <https://doi.org/10.1109/ECTC.2004.1319385>).
Smith, M. (2010). Aluminum Core-Shell Nanoparticles: Synthesis, Properties, and Applications. School of Engineering of University of Dayton.
Baschung, D. Grune, H. H. Licht, M. Samirant, in K.K. Kuo, L.T. DeLuca (editors), Combustion Phenomena of a Solid Propellant Based on Aluminium Powder, New York, NY: Begell House 2002, 219-25.
Fredin et al., Sustainable High Capacitance at High Frequencies; Metallic Aluminum Polypropylene Vanocomposites; ACS Nano, vol. 7, No. 1, 396-407—2013.
Johnson, et al., Characterization of Nanometer-to Micron-Sized Aluminum Powders: Size Distribution from Thermogravimetric Analysis; Journal of Propulsion and Power vol. 23, No. 4, Jul.-Aug. 2007.
Kuo, et al., Combustion of Energetic Material; The Fifth International Symposium on Special Topics in Chemical Propulsion, Stresa (Lake Maggiore), Italy. Jun. 2000.
Meda, et al., Nano-Aluminum as Energetic Material for Rocket Propellants; Materials Science and Engineering C 27 (2007) 13.
Pecharroman and Moya, Experimental Evidence of a Giant Capacitance in Insulator-Conductor Composites at the Percolation Threshold; Advanced Materials 2000, 12, 294.
R. K. Ulrich, W. D. Brown, Advanced Electronic Packaging, New Jersey: IEEE Press, 2nd edition 2006.

* cited by examiner

*Primary Examiner* — Hannah J Pak
(74) *Attorney, Agent, or Firm* — Lewis Brisbois Bisgaard & Smith, LLP; Howard M. Gitten, Esq.

(57) ABSTRACT

A dielectric composite material includes an electrical insulator and primary nanoparticles. The primary nanoparticles are dispersed, without forming agglomerates, within the electrical insulator. The primary nanoparticles are of one more of the following types: aluminum, aluminum oxide, or aluminum coated with a surface oxide layer, and the electrical insulator being a dissimilar material from the primary nanoparticles.

12 Claims, 2 Drawing Sheets

Charge polarization in nanocomposite polymer dielectric film

DIELECTRIC COMPOSITE CONTAINING DISPERSED PRIMARY NANOPARTICLES OF ALUMINUM OR ALUMINUM OXIDE

CROSS REFERENCE TO RELATED APPLICATIONS

This application claims the benefit of U.S. Provisional Application No. 62/642,683 filed on Mar. 14, 2018. The entire contents of this application is incorporated herein by reference in its entirety.

FIELD

This present invention is directed to dielectric composite materials containing primary nanoparticles of aluminum, and in particular capacitors formed of these materials as the dielectric medium.

BACKGROUND

Dielectric materials for capacitors with improved performance characteristics, lower cost, and better ease of processability are desired by the electronics and power industries. Anticipated benefits of such materials include the miniaturization of discrete capacitors and related devices, increased energy density, improved performance of embedded capacitors, increased capacitance and miniaturization of high voltage capacitors and capacitors for pulse power systems, miniaturization and increased energy density for electrical and hybrid vehicle power systems, and improved high temperature performance of capacitors.

Current state of the art high-performance dielectric materials utilize one of several general material types, including polymers, ceramics, ferroelectric materials, polymers with ceramic or ferroelectric particle fillers, and polymers or other electrical insulators containing electrically conducting particle fillers. However, composites of conducting particle fillers in an insulating matrix are theoretically predicted to exhibit extremely high dielectric constants, on the order of several thousand, which are comparable to the dielectric constants of ferroelectric materials such as barium titanate. Such high dielectric constants are theoretically obtained when the insulating matrix contains very small conducting particles, i.e. nanoparticles, which create a high specific conductor/insulator interfacial area, and when the conducting filler concentration is high enough to approach the percolation threshold. For such a composite, aluminum is predicted to be an ideal material for the conducting particle filler, due to its relatively low cost, high conductivity, and ability to form an electrically insulating native oxide layer on its surface. However, composites of this type containing aluminum have heretofore suffered from a main problem, which is poor performance due to microstructures being comprised of aggregates and/or agglomerates of aluminum nanoparticles. Aggregation and agglomeration of the conducting filler particles creates electrically conductive pathways through the composite, causing dielectric breakdown. Furthermore, aggregation and/or agglomeration of the nanoparticle fillers reduce the insulator/conductor interfacial area, which lowers the dielectric constant and affects dielectric loss behavior. See Fredin, L. A., Li, Z. Lanagan, M. T., Ratner, M. A., Marks, T. J., Sustainable High Capacitance at High Frequencies: Metallic Aluminum-Polypropylene Nanocomposites, ACS Nano 2013, 7, 396-407 ("Fredin").

For at least this reason, examples of dielectric composites with aluminum nanoparticle fillers have heretofore been limited to low aluminum concentrations, See Fredin. These low concentrations reduce the probability of conductive pathways causing dielectric breakdown. The dielectric constants of these compositions fall well below the very high values that are desired and necessary.

Many polymers have high dielectric strengths, making them suitable for high voltage capacitor applications, but they have relatively low dielectric constants, which limits the charge storage density of polymer film capacitors. Typical polymers in logic devices have dielectric constants in the range of 2-5, resulting in specific capacitances from 0.07 to 1.5 nF per centimeter squared. See by way of example, R. K. Ulrich, W. D. Brown, *Advanced Electronic Packaging*, New Jersey: IEEE Press, 2nd edition 2006.

Currently, the most common type of polymer film capacitors use biaxially oriented polypropylene (BOPP) as the dielectric medium. A major drawback for modern power applications is that BOPP dielectrics suffer from reduced performance at the temperatures above 70° C. One of the major contributors to performance degradation is the increased dielectric loss of BOPP at high temperature and high field, which causes resistive heating and can lead to thermal runaway. The dielectric properties of conventional polymers are derived from the polarization of chemical bonds within the polymer. At high temperature, charge within the polymer becomes more mobile, which leads to increased dielectric loss, resistive heating, and reduced charge-discharge efficiency.

Polymers filled with electrically conducting particles have been identified as potential next-generation high energy density materials due to their ease of processing and potential to achieve extremely high dielectric constants. Composites of conductive fillers within an electrically insulating polymer matrix can exhibit dielectric constants three to four orders of magnitude higher than those of the polymer alone. Conductor-filled polymers achieve their high dielectric constants through phenomena associated with electrical percolation. Percolation theory predicts that conductor-polymer composites can obtain high dielectric constants when the conductor particle concentration in the composite is near, but below, a critical value known as the percolation threshold. As the conductor concentration approaches the percolation threshold, its dielectric constant increases according to the equation $\varepsilon = \varepsilon_0 / |f_c - f|^q$, where $\varepsilon$ is the composite relative permittivity (i.e. dielectric constant), $\varepsilon_0$ is the permittivity of free space, f is the particle filling factor, and $f_c$ is the filling factor at the percolation threshold. See C. Pecharroma'n, J. S. Moya, *Advanced Materials* 2000, 12, 294. Polymers filled with conducting particles such as metals, carbon, and ceramic-metals have all demonstrated dramatic increases in permittivity near the percolation threshold. However, above the percolation threshold, the enhancement of the dielectric constant is lost, and the composite begins to exhibit conductive properties.

In conductor-filled polymer dielectric materials, the augmented dielectric constant exists in the interfacial layer between the polymer and the conductive filler particles. Decreasing the particle size of the conductive fillers therefore increases the concentration of the interfacial layer. Agglomeration and non-uniform distribution of conductive fillers in the polymer produce connected networks of conducting particles, and cause dielectric breakdown at concentrations below those needed to achieve the highest predicted dielectric constants.

As realized by the inventor, ne significant factor that previously prevented the development of a material with the above described properties is the inherent agglomeration of all prior art forms of aluminum nanoparticles. Each of the prior art methods for producing aluminum nanoparticles results in powders comprised of agglomerated nanoparticles. See C. E. Johnson, S. Fallis, A. P. Chafin, T. J. Groshens, K. T. Higa, I. M. K. Ismail, T. W. Hawkins, *Journal of Propulsion and Power* 2007, 23, 669-682. Aluminum nanopowders have previously been commercially produced by three methods: electrical explosion of metallic wire: B. Baschung, D. Grune, H. H. Licht, M. Samirant, in K. K. Kuo, L. T. DeLuca (editors), *Combustion of Energetic Materials*, New York, N.Y.: Begell House 2002, 219-25), plasma condensation, and mechanical milling (L. Meda, G. Marra, L. Galfetti, F. Severini, L. De Luca, *Materials Science and Engineering C* 2007, 27, 1393. All these methods produce powders consisting of agglomerated nanoparticles that are impossible to re-disperse by any known method when combining with a polymer. (C. E. Johnson, S. Fallis, A. P. Chafin, T. J. Groshens, K. T. Higa, I. M. K. Ismail, T. W. Hawkins, *Journal of Propulsion and Power* 2007, 23, 669-682) An ideal conductor-filled polymer microstructure therefore cannot be achieved using these materials described in the prior art. The prior art suffered from the disadvantage that it is not able to achieve the requisite composition homogeneity and uniform, unagglomerated dispersions of primary nanoparticles, especially when the particle size ranges are very small (<100 nm).

Another prior art production method is known from US Patent Application Publication No. US 2013/0317170 A1, Marks et al (2013) ("Marks"). Marks discloses a composite comprised of a polyolefin polymer filled with aluminum nanoparticles with an aluminum oxide coating. Mark's composite is produced by an in situ polymerization technique, in which a commercially available aluminum nanoparticle powder (with native oxide coating) is functionalized with a polymerization catalyst, after which propylene is polymerized around the functionalized particles, in so forming the composite of aluminum in polypropylene. Marks uses terms such as "homogeneous" and "well dispersed" in describing the dispersion of aluminum nanoparticles in their disclosed composite, but does not disclose a composition of dispersed primary nanoparticles of aluminum. This fact is made clear in FIG. 14 in Marks, in which the aluminum-polypropylene composites are imaged by transmission electron microscopy. In these images, aggregates and/or agglomerates of the aluminum particles are clearly visible as dark regions within the polymer. Possibly as a result of this non-ideal microstructure, the dielectric constant (i.e. permittivity) of Marks' composites are measured to be in the range of 3-6.5, which are at least one to two orders of magnitude lower than the dielectric constants of the presently disclosed composition. Therefore Marks does not overcome the shortcomings of the prior art.

The present invention, which contains dispersed primary nanoparticles, overcomes key limitations and the above described problems associated with prior art conductor filled insulator composites, and especially those in which the conductor is aluminum.

SUMMARY OF THE INVENTION

A dielectric composite material includes an electrical insulator and primary nanoparticles. The primary nanoparticles are dispersed, without forming agglomerates, within the electrical insulator. The primary nanoparticles one more of the following types: aluminum, aluminum oxide, or aluminum coated with a surface oxide layer, and the electrical insulator being a dissimilar material from the primary nanoparticles.

BRIEF DESCRIPTION OF THE DRAWINGS

The features and advantages of the present invention will become more readily apparent from the following detailed description of the invention in which like elements are labeled similarly and in which.

DETAILED DESCRIPTION

Figure 1A:
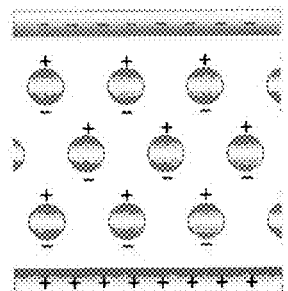
FIG. 1*a* is a schematic diagram showing the charge polarization of dispersed primary aluminum nanoparticles in an electric field in a material constructed in accordance with the invention.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiments include composite materials containing unagglomerated primary nanoparticles of aluminum, aluminum oxide, aluminum coated with a surface oxide layer, or combinations of these materials, which are separated from each other by at least one dissimilar material.

Disclosed embodiments include capacitors with the described composite materials as the dielectric medium. These embodiments include but are not limited to film capacitors in which the present composite material is used in place of a conventional dielectric polymer film such as BOPP, and multi-layer capacitors in which the present composite material is used in place of a conventional ceramic dielectric material. The disclosed composite material can exist in several different forms, depending on the function of the dielectric medium and capacitor. Examples forms include but are not limited to self-supporting films or sheets, metalized self-supporting films, films deposited on a substrate with or without metallization, fibers, and filaments.

For the purpose of this disclosure, the term "primary nanoparticle" means a particle that is the smallest discrete identifiable entity observable by transmission electron microscopy, and excludes aggregates or agglomerates of such particles. The terms "aggregate" and "agglomerate", which are often used interchangeably in the field of materials science, mean clusters of more than one primary particle, which are held together by physical or chemical interactions. The primary nanoparticle may be a homogeneous particle comprised of a single type of material (i.e. of uniform chemical composition), or it may contain more than one type of material, such as an aluminum oxide layer on the surface of an aluminum particle, or organic molecules chemically bonded to the surface of an inorganic particle. Two or more primary nanoparticles that are separated from each other by a dissimilar material are not considered to be aggregated or agglomerated, i.e., they are unagglomerated.

In describing the microstructure of composites, especially composites containing nanoparticles, terms such as "homogeneous" and "uniform" are commonly used in the academic and patent literature to describe the quality of dispersion of particles in their surrounding medium. In the inventor's review of the literature, we find these terms to be problematic in describing the microstructure of the subject composites. These terms are problematic because they are subjective, with meanings that change based on the context and size regimes being described. For clarity in this disclosure, the inventors therefore use the term "dispersed primary nanoparticles" to differentiate between the microstructures of the disclosed compositions and prior art describing uniform or homogeneous particle dispersions at various context size scales, which may contain dispersed nanoparticle aggregates or agglomerates, but which do not contain dispersed primary nanoparticles.

Disclosed embodiments are materials with dielectric properties favorable for use in capacitors, and which fall in the general classification of conductor filled insulator composites. The conductor component includes primary nanoparticles of aluminum or aluminum coated with aluminum oxide (i.e. the native oxide of aluminum). The nanoparticle size range is typically less than 200 nm in diameter, and preferably less than 50 nm in diameter.

The insulator component includes at least one type of polymer, silicone, or organic (carbon-containing) material, and may optionally include other types of particles with electrical insulation properties interspersed between the conductor particles. Examples of insulator component materials include, but are not limited to, polypropylene, biaxially oriented polypropylene, polyethylene terephthalate, polyvinylidene fluoride, polycarbonates, polyimides, polystyrene, poly(ether, ether ketone), polyphenylene sulphide, and polysiloxanes.

In another embodiment of this material, the polymer, silicone, or organic component is removed during processing of the material, such as by thermal decomposition, leaving behind a different type of insulating material (for example, a carbonaceous material derived from the decomposition of a polymer), or oxides of aluminum or of a different metal, or pores or voids. In this embodiment, the primary aluminum nanoparticles are separated and electrically isolated from one another by one or more of these different types of insulating materials.

The novel characteristic of each of these embodiments is a composition that includes unagglomerated primary nanoparticles of aluminum or aluminum oxide, which are separated from one another by at least one type of electrically insulating material. The unaggregated and unagglomerated nature of the primary nanoparticles in the insulating matrix are responsible for the favorable dielectric properties of the material.

The disclosed embodiments overcome the shortcomings of the prior art by including compositions of insulating materials filled with unagglomerated primary nanoparticles of aluminum. In contrast to the prior art, the disclosed compositions have uniform microstructures that lack aggregates or agglomerates of conducting particles. These new microstructures eliminate conductive pathways at concentrations up to the percolation threshold, and allow all the surface area of the primary nanoparticles to be included in the insulator/conductor interfacial area, thereby maximizing the dielectric constant per volume loading of filler. The resulting compositions achieve higher dielectric constants than the prior art, and can be fabricated into mass-produced practical capacitor devices due to their inherent microstructural uniformity, which extends to the nanoscale (i.e. sub-1000 nm) size regime.

To overcome the problem of primary nanoparticle agglomeration in conductor filled polymer composite dielectric materials, the inventors looked to a method previously developed to produce aluminum nanoparticle polymer composites for propellant and explosive applications. U.S. Pat. No. 9,573,857 B2, Reid et al. (2017) ("Reid") describes a method to synthesize nanoparticles of aluminum beginning with a molecular precursor of aluminum such as an amine adduct of alane, and combining it with a polymer such as hydroxyl terminated polybutadiene (HTPB), to which has been bonded an organometallic complex that acts as a catalyst to decompose the aluminum precursor. Upon combining the aluminum precursor with the catalyst-functionalized polymer, the precursor decomposes to form metallic aluminum particle nuclei, which as they form become coated with the catalyst-attached polymer molecules. This reaction mechanism, involving the simultaneous formation of aluminum particle nuclei by action of the catalyst and their coating with the polymer to which the catalyst is attached, produces a composite material containing dispersed primary nanoparticles of aluminum as a binder component in a propellant or explosive, in which the rapid combustion of the dispersed primary aluminum nanoparticles increases the propellant or explosive performance.

The present invention uses composites containing 20-60 percent aluminum by mass, which is much higher than the concentrations of aluminum envisioned for propellant or explosive applications. Additionally, the present invention makes use of an oxidizing agent such as oxygen or water in a controlled reaction to form an oxide coating on the aluminum nanoparticles. This method can also produce a composition of aluminum oxide primary nanoparticles, through the total oxidation of the aluminum nanoparticles. The inventor discovered that these composites unexpectedly exhibited extremely high dielectric constants, ranging from approximately 55 to over 1,000, more than 15 times greater than those found in Marks, depending on the mass percentage of aluminum in the polymer. The inventors also discovered other unexpected favorable dielectric properties of these materials, including the relatively low dielectric loss, and stability of the dielectric properties up to 125° C.

The inventor determined that an ideal conductor-filled polymer for dielectric capacitor applications should have material properties including the following: 1) smallest possible size of the conducting particles, i.e. nanoparticles, which maximizes the particle number density and interfacial area; 2) a substantially complete lack of conductor particle aggregation or agglomeration even at high particle concentrations, to avoid the formation of conducting paths through the polymer; 3) a substantially uniform, homogeneous dispersion of the conducting particles in the polymer, which is required for uniformity of film dielectric properties. Many different types of conducting particles have been studied for use in conductor-filled polymers for dielectric applications, including different types of metals and carbonaceous conductors. Aluminum particles have several advantages over other types of conducting particles in these materials. Aluminum is relatively inexpensive, highly conductive, and has well known surface passivation properties. The bare aluminum surface is extremely reactive, and is readily oxidized to form an aluminum oxide layer. Alternatively, the aluminum surface can be passivated by a variety of organic compounds and polymers via chemical bonding. The surface passivation of aluminum nanoparticles, by either oxide or organic layer, creates a dense electrically insulating layer surrounding the conducting particle. This insulating layer impedes charge conduction and enhances the dielectric strength of the filled polymer compared to other types of conductor-filled polymers.

The disclosed embodiments exhibit material properties that are ideal for use as a dielectric medium in capacitors, and which are improvements over the prior art in the field of conductor-filled insulating composites. For example, it is critical to precisely control the conductor volume fraction in this type of material. Near the percolation threshold, small variations in conductor content result in large variations in dielectric properties. The compositional homogeneities of the disclosed embodiments enables precise control of the conductor particle volume fraction. The disclosed embodiments have the properties of uniform particle dispersion and lack of agglomeration, which are crucial to achieving high permittivity and dielectric strength.

Figure 3A:
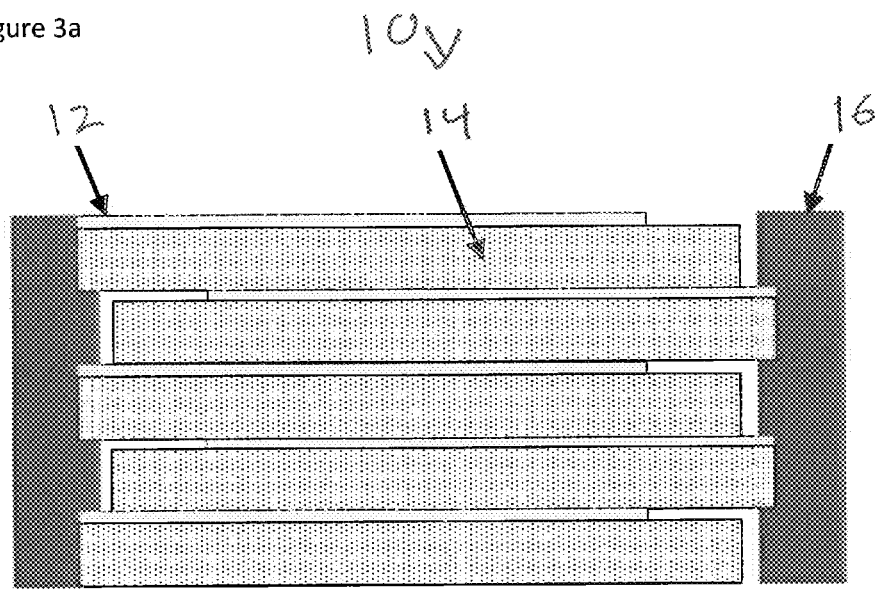
FIG. 3*a* is a capacitor constructed in accordance with one embodiment of the invention.

The disclosed embodiments include capacitors using the material of the present invention described above as the dielectric layer or layers. While there are numerous designs of possible capacitor devices that could use the present invention as the dielectric layer(s), two general examples are given in FIGS. 3a and 3b.

Many capacitor designs in the prior art could be improved by replacing the prior art dielectric layers with layers comprised of the present invention. A schematic of an internal cross-section of a film capacitor made using the present invention as the dielectric film is given in FIG. 3a. Capacitor 10 includes stacked alternating metallization layers 12 and dielectric layers 14 disposed between electric contacts.

Capacitors of this design may be fabricated, for example, by winding the metallized nanocomposite film, or by co-winding the nanocomposite film with a metal foil, or by stacking layers of metallized film or alternating layers of nanocomposite film and metal electrode.

Figure 3B:
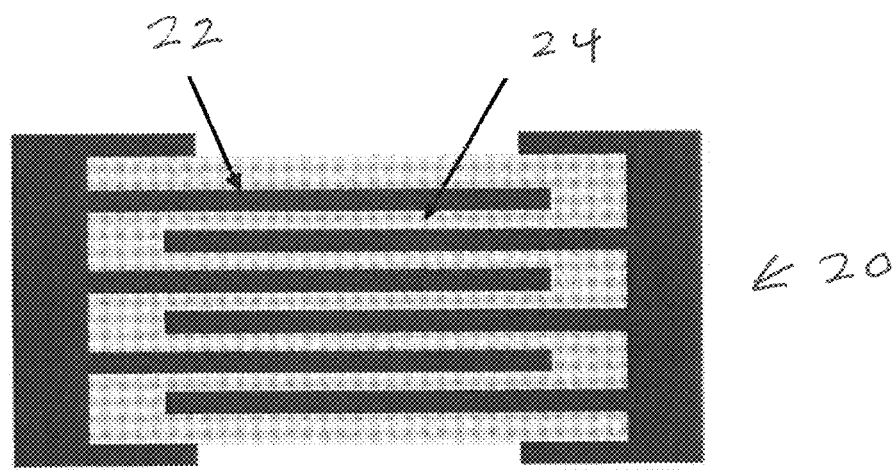
FIG. 3*b* is a capacitor constructed in accordance with another embodiment of the invention.

A schematic of an internal cross-section of a multilayer capacitor using the present invention as the dielectric layers is given in FIG. 3b. A capacitor 20 includes layers of electrode fingers 22 extending into and surrounded by dielectric material 24.

Capacitors of this design may be fabricated, for example, by a process similar to those commonly used to produce ceramic multilayer capacitors. In each of capacitors 10 and 20 the dielectric material is the material described above.

Examples

Disclosed embodiments are further illustrated by the following specific Examples, which should not be construed as limiting the scope or content of this Disclosure in any way.

Experiments were performed to characterize the dielectric properties of the disclosed embodiments when processed into thin metalized films. The experiment used butadiene based polyurethane polymer films containing dispersed primary aluminum nanoparticles. The experiments demonstrated the process for fabricating the disclosed embodiment dielectric films, and to characterize the dielectric constant and dielectric loss of the films at room temperature and 125° C.

Figure 1B:
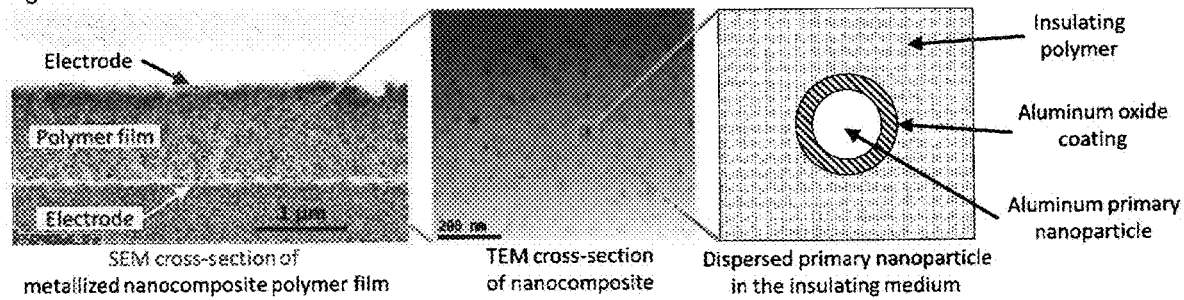
FIG. 1*b* is an SEM image showing the structure of a parallel plate capacitor constructed in accordance with the invention, a first TEM image showing the primary nanoparticles of aluminum dispersed in the polymer film; and a second TEM image showing a dispersed primary nanoparticle of aluminum (diameter approximately 20 nm) with an aluminum oxide coating.

The dielectric films were created using a solvent casting process. First, a solution consisting of primary nanoparticles of aluminum dispersed in a polyurethane polymer, which in turn were dissolved in the organic solvent toluene, was prepared according to the method described in Reid, which is identified as if fully set forth herein. This solution was spin-coated onto partially metallized glass substrates to produce uniform 1 μm thick polymer films coating the substrate. Top electrodes were then deposited by thermal evaporation of aluminum through a pattern mask. A scanning electron microscopy (SEM) cross-section of one of these metallized nanocomposite polymer films is shown in FIG. 1b. A transmission electron microscopy (TEM) image of a cross-sectional slice of a representative nanocomposite is shown in the middle panel of FIG. 1b. The dispersed primary nanoparticles of aluminum are clearly visible in this image as the dark contrast particles embedded in the lighter contrast polymer. An illustration is given in the right panel of FIG. 1b depicting a dispersed primary nanoparticle of aluminum with an aluminum oxide coating and the surrounding insulating polymer medium. The film dielectric properties were characterized at room temperature and at 125° C. using an LCR meter.

Figure 2:
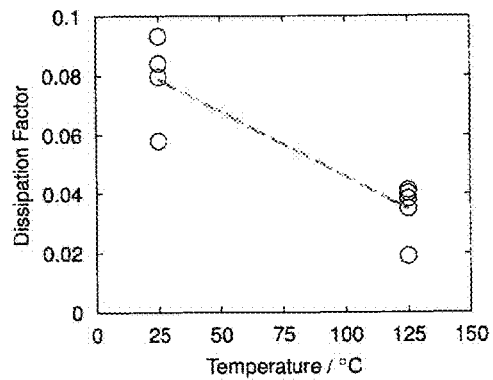
FIG. 2 shows the dissipation factor at 25° C. and 125° C. of a composition constructed in accordance with invention containing 30% aluminum by mass, which has a dielectric constant of 55.

The resulting nanocomposite films containing 30% aluminum by mass had very high dielectric constants of 55±0.15. This dielectric constant is approximately 20 times higher than the dielectric constant the polyurethane polymer alone, which is in the range of 2-3. The dielectric constant varied by less than 10% over the measured ranges of frequency from 1-200 kHz, and at temperatures from 25-125° C. The film's dielectric properties improved with increasing temperature, with the dissipation factor decreasing from about 0.08 at room temperature to 0.05 at 125° C. This observation is contrary to the effects observed with pristine polymer films, which generally exhibit higher dielectric loss at elevated temperature. FIG. 2 shows the dissipation factors of the measured polyurethane nanocomposite films measured at 25° C. and 125° C. Despite their very high dielectric constants, the nanocomposite films retained dielectric loss values within the expected range for the base butadiene polyurethane polymer. In general, butadiene polymers exhibit high dielectric loss, which is typically several percent at room temperature.

The experimental results demonstrate success in producing the present embodiment composite films with novel dielectric properties. The electronic polarization phenomena of the primary aluminum nanoparticles appear to dominate over the chemical bond polarization phenomena of the polymer matrix. The dominant nanoparticle polarization mechanism does not appear to produce any degradation of dielectric properties at high temperature, and improve as temperature increases. The improvement in dielectric properties at high temperature may be related to the reduction in conductivity of the metal nanoparticles with increasing temperature, whereas insulators such as polymers and ceramics exhibit increasing conductivity with temperature.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A dielectric composite material comprising:
an electrical insulator;
unagglomerated primary nanoparticles homogenously dispersed within the electrical insulator without forming agglomerates, the unagglomerated primary nanoparticles being at least one of aluminum, aluminum oxide, and aluminum coated with a surface oxide layer; and
the electrical insulator being a dissimilar material from the unagglomerated primary nanoparticles.

2. The dielectric composite material of claim 1, wherein said electrical insulator is a polymer, silicone, or organic carbon-containing material.

3. The dielectric composite material of claim 1, wherein said dielectric composite material contains twenty percent to sixty percent aluminum by mass.

4. The dielectric composite material of claim 1, wherein said electrical insulator is a carbonaceous material derived from the decomposition of a polymer.

5. The dielectric composite material of claim 1, wherein said electrical insulator is one of an oxide of aluminum or of a metal other than aluminum.

6. The dielectric composite material of claim 1, wherein said dielectric composite material is formed into one or more of the following: a self-supporting film, a metalized self-supporting film, a film deposited on a substrate with or without metallization, a multi-layer film, a fiber, or a filament.

7. A capacitor comprising the dielectric composite material of claim 1.

8. The capacitor of claim 7, wherein the dielectric composite material contains twenty percent to sixty percent aluminum by mass.

9. The capacitor of claim 7, wherein said dielectric composite material is formed into one or more of the following: a self-supporting film, a metalized self-supporting film, a film deposited on a substrate with or without metallization, a multi-layer film, a fiber, or a filament.

10. The capacitor of claim 7, wherein said electrical insulator is a carbonaceous material derived from the decomposition of a polymer.

11. The capacitor of claim 7, wherein said electrical insulator is one of an oxide of aluminum or of a metal other than aluminum.

12. The capacitor of claim 7, wherein said electrical insulator is a polymer, silicone, or organic carbon-containing material.

* * * * *